United States Patent [19]

Liesegang

[11] Patent Number: 5,083,730
[45] Date of Patent: Jan. 28, 1992

[54] TRAVERSE FOR SUPPORT STRUCTURES IN INDUSTRIAL USE

[75] Inventor: Gerhard Liesegang, Zeven, Fed. Rep. of Germany

[73] Assignee: Lisega GmbH, Fed. Rep. of Germany

[21] Appl. No.: 603,978

[22] Filed: Oct. 24, 1990

[30] Foreign Application Priority Data

Oct. 24, 1989 [DE] Fed. Rep. of Germany ....... 3935385

[51] Int. Cl.⁵ .............................................. F16L 3/00
[52] U.S. Cl. ...................................... 248/49; 248/346
[58] Field of Search .................. 248/49, 678, 346, 670

[56] References Cited

U.S. PATENT DOCUMENTS

| | | | |
|---|---|---|---|
| 991,736 | 5/1911 | Minnick | 248/49 |
| 3,039,730 | 6/1962 | Heigl | 248/346 |
| 3,248,077 | 4/1966 | Chardes | 248/678 X |
| 4,362,289 | 12/1982 | Meade | 248/670 X |

FOREIGN PATENT DOCUMENTS

| | | | |
|---|---|---|---|
| 3814912 | 11/1989 | Fed. Rep. of Germany | 248/49 |
| 772344 | 10/1934 | France | 248/49 |

Primary Examiner—Alvin C. Chin-Shue
Attorney, Agent, or Firm—Diller, Ramik & Wight

[57] ABSTRACT

The transverse for support structures in industrial use, e.g. for receiving constructional components such as pipe conduits and the like, consists of two upright U-shaped iron members (2,3) having their flanges averted from each other. The U-shaped iron members (2,3) are connected by at least one connecting member. The connecting member for the U-shaped iron members (2,3) consists of a web plate (4) provided transversely to the longitudinal extension of the U-shaped iron members (2,3) and between the U-shaped iron members. The web plate (4) and the U-shaped iron members (2,3) are held together by a plug connection (8,9,11,12).

18 Claims, 2 Drawing Sheets

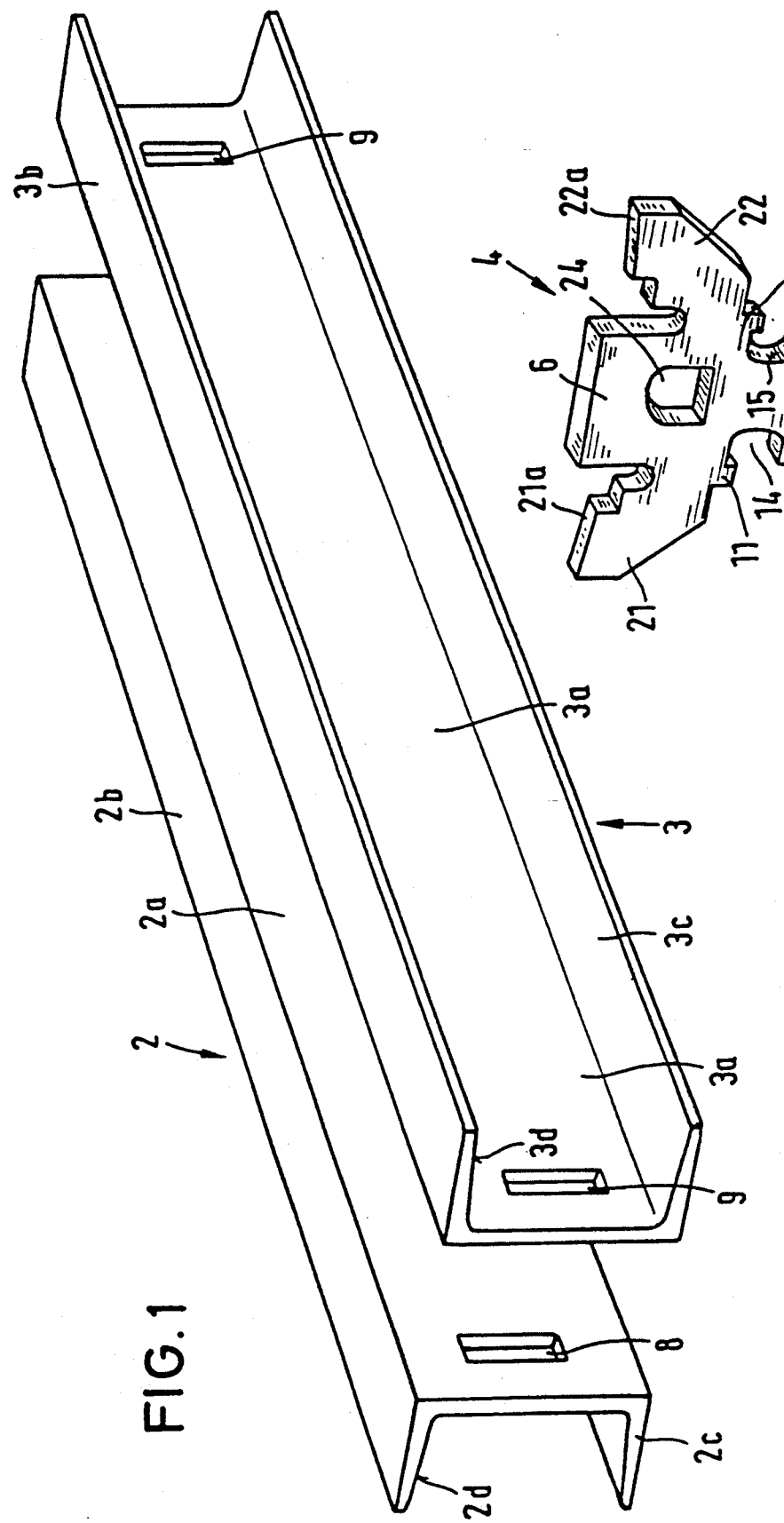

TRAVERSE FOR SUPPORT STRUCTURES IN INDUSTRIAL USE

SUMMARY OF THE INVENTION

The invention is directed to a traverse for support structures in industrial use, for receiving constructional components, e.g. pipes, particularly pipe conduits in power plants or industrial plants, e.g. in chemical industry and the like, consisting of two upright U-shaped iron members having their flanges averted from each other and being connected by at least one connecting member.

Traverses of the above type are particularly suited for receiving conduit supports, especially of pipes or pipe conduits, and, for the assembly of pipe-conduits, can be used both for rigid suspension and in combination with spring shackles and constant shackles. The above traverses are usually welded structures wherein the two U-shaped iron members have their upper and lower ends connected by brackets which are welded to the flanges of the U-shaped iron members to form an intregral unit therewith. A welded structure suffers from the disadvantage that its use is restricted to a predetermined practical application whereas the structure can hardly or not at all be changed for other applications. Also, welded structures are usually heavy structures.

It is the object of the invention to provide a traverse for universal purposes, particularly for industrial support structures for pipes and pipe conduits, which is simple in construction, can be easily mounted and dismounted and can be easily and fast adapted to various sizes. According to the invention, the traverse of the above type is characterized in that the connecting member for the U-shaped iron members consists of a web plate provided transversely to the longitudinal extension of the U-shaped iron members and between said U-shaped iron members, and in that the web plate, for forming a unitary traverse structure with the U-shaped iron members, is fastened to the U-shaped iron members by a plug connection.

By the above arrangement of the traverse, the traverse structure can be easily and readily changed as required by the various uses and types of loading. The plug connection allows exchange of web plates of different sizes so that the traverse can be individually adapted to the respective uses. At the same time, the web plates can be easily exchanged for the various types of loading. The web plate can be kept in store for any one of different sizes. For assembling the complete traverse, only a simple mounting process is required, without the need of additional manipulations.

According to a further feature of the invention, the web plate or sheet, resp. is provided with an intermediate member determining the mutual distance of the U-shaped iron members. The web wall of the U-shaped iron members, being arranged between the flanges, is provided with slots being engaged by the projections of the web plates. Thus, there is provided a simple and effective connection between the U-shaped iron members and the connecting member, being also stable enough for all requirements.

According to a still further feature of the invention, the projections of the web plate extend up to the lower surface of the upper flange of the U-shaped iron member. Thereby, the upper flanges of the U-shaped iron members are supported in a very stable manner, so that the traverse is also adapted for supporting heavy constructional components which otherwise would weigh too heavily on the flanges of the U-shaped iron members. Preferably, the upper end face of the projections is adapted to the bevel of the lower edge of the flanges of the U-shaped iron member, thus providing effective support of the upper flanges over the whole width thereof.

The plug connection is also safeguarded against disengagement of the members from each other. Preferably, to this purpose, a threaded bolt is provided at the lower end of the slot of the U-shaped iron member, the diameter of the shaft of said threaded bolt corresponding to the width of the slot. The web plate can be provided with a recess for receiving the bolt head. Also the threaded bolt, provided as a locking member, can be manufactured in series and causes practically no costs worth mentioning. Cohesion of the members assembled by the plug connection is safeguarded in a simple manner. The threaded bolt can be provided with a nut being arranged on the inner side of the U-shaped iron member.

On principle, the height of the web plate will correspond to the height of the U-shaped iron member. However, depending on the specific application, the height of the web plate will be larger or smaller than that of the U-shaped iron member. It is essential that, by the web plate vertically interposed between the U-shaped iron members, the web portion of the U-shaped iron members is considerably reinforced against bending of the traverse. Thus, the traverse can support massive loads and provides safe support even in case of extremely heavy constructional components.

The traverse of the invention is adapted for supporting loads, particularly heavy loads, on the upper flanges of the U-shaped iron members. The traverse is also adapted for supporting loads, particularly heavy loads, which are pending down from it. For the latter case, the intermediate portion of the web plate has perforations or openings formed therein for receiving a holding member, e.g. a holding bar or the like.

An embodiment of the invention will be explained hereunder with reference to the drawings.

BRIEF DESCRIPTION OF THE DRAWINGS

FIG. 1 is a perspective view of a traverse consisting of two U-shaped iron members, FIG. 2 is a perspective view of the connecting member of the invention, for connecting the U-shaped iron members of the traverse.

DESCRIPTION OF THE PREFERRED EMBODIMENTS

Figure 3:
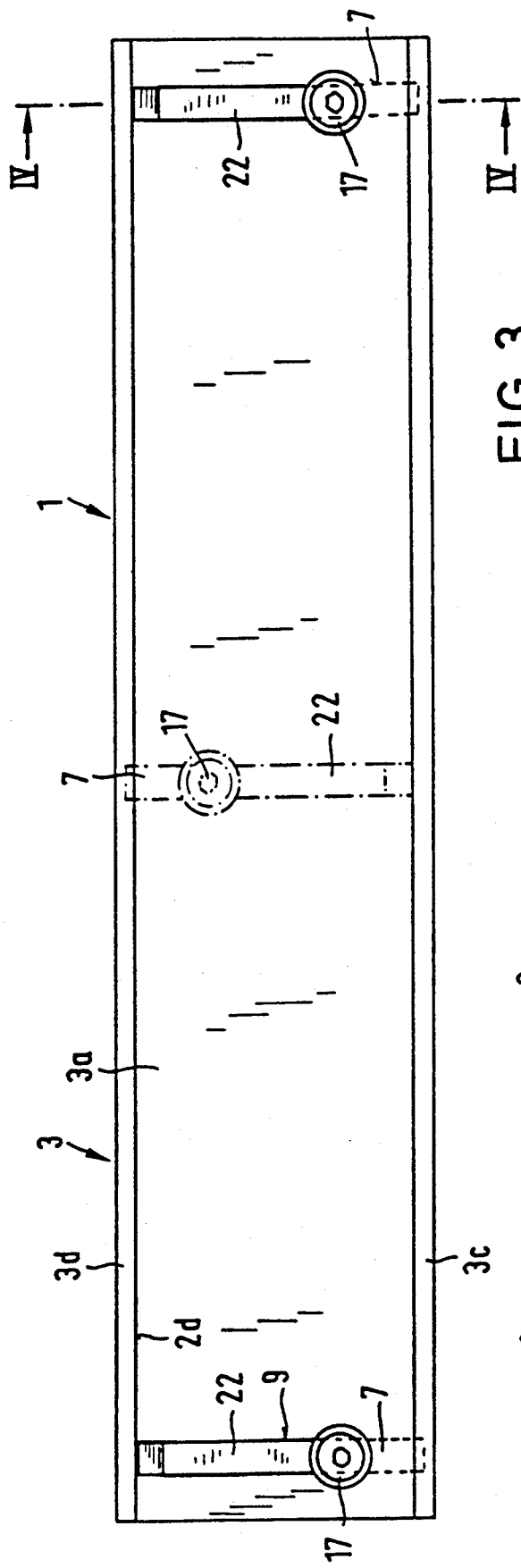
FIG. 3 is a side view, on a larger scale, of the traverse of the invention.
Figure 4:
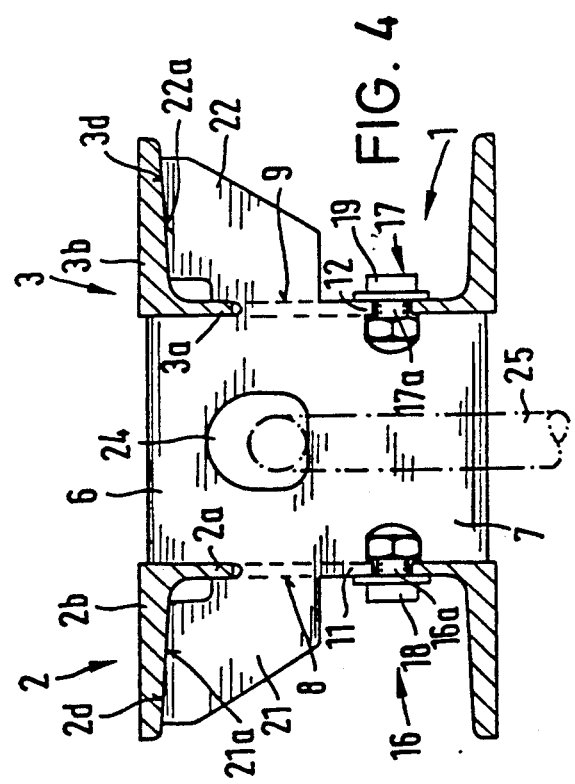
FIG. 4 is a sectional view along the line IV—IV in FIG. 3.

The traverse 1 for receiving loads placed upright thereon or hanging down therefrom, e.g. pipe conduits in power plants and the like, consists of two U-shaped iron members 2 and 3 having their flanges facing away from each other. The U-shaped iron members 2,3 are rigidly connected in transverse direction by a connecting member 4. Said connecting member is a web plate 5 or a web sheet and has a central portion 6 and 7 determining the mutual distance of the U-shaped iron members 2,3. The web walls 2a,3a of the U-shaped iron members 2,3, are provided, at predetermined locations between the flanges 2b,2c and 3b,3c, with slots 8 and 9 being engaged by the projections of the web plates 4. To both sides of its central portion 6,7, the web plate 4 is provided with projections 11,12 engaging with the slots 8,9. Under the projections 11,12 of web plate 4, there is provided a recess 14,15, respectively, for receiving a safety member. Preferably, the safety member is a threaded bolt 16,17, the diameter of its shaft 16a,17a corresponding to the width of the slots 8,9.

Thereby, the web plate is secured to the U-shaped iron members and fixed against vertical displacement in a simple manner. By a nut 18,19 at the free end of the bolt shaft, the U-shaped iron members are clampingly attached to the web plate so that these members are rigidly connected to each other.

The projections 11,12 of the central portion 6,7 of web plate 4 are provided with extension portions 21,22 being guided up to the respective lower edge 2d,3d of the upper flanges 2b,3b. Thereby, the upper flanges 2b,3b of the U-shaped iron members 2,3 are effectively supported by the web plate 4 arranged at a right angle to the longitudinal extension of the U-shaped iron members 2,3. This results in a high loading capacity of the U-shaped iron members 2,3. Preferably, the upper end face 21a and 22a of the extension portions 21,22 of web plate 4 is adapted to the bevel of the lower edges 2d,3d of the flanges 2b,3b, thus providing effective support of the flanges on the extension portions 21,22 of web plate 4.

The central portion 6,7 of web plate 4 can have a perforation or opening 24 formed therein. These openings 24 serve for receiving holding bars 25 for the pending load.

The threaded safety bolts 16,17 can be arranged both at the lower and the upper ends of slots 8,9, as can be seen in FIG. 3. This depends on the respective type of loading. Then, the web plates are inserted in reverse directions between the U-shaped iron members.

The U-shaped iron members with the web plates form a rectangular structure of high bending resistance. Also the connecting rigitity of the traverse is extraordinarily high. The described traverse is of optimum use for supporting considerable loads from below or by suspension. By the web plates, being used as plate members, the U-shaped iron members are made into a tightly secured box-shaped structure with high loading capacity. No welding is required for assembling the traverse. The traverse is a reliably interconnected structure made from components which are easily manufactured.

I claim:

1. A crosspiece for mounting pipes or the like comprising a pair of U-beams each defined by a web wall and a pair of flanges, said U-beams being positioned with their web walls in generally upright relationship to each other and with the pairs of flanges being in oppositely directed relationship to each other, a slot in each web wall, each slot having upper and lower slot portions defined by respective upper and lower web wall portions, a web plate in spanning interlocked relationship between said U-beams; said web plate including a central portion, opposite end portions, and upper and lower edge portions; said web plate central portion being positioned between said web walls, each web plate end portion projecting through an associated one of said slots, a pair of indentations opening through one of said web plate upper and lower edge portions and receiving therein one of said upper and lower web wall portions, a pair of projection portions generally aligned with said pair of indentations and projecting in a direction opposite to the opening direction of said indentations, and a securing member located between each projection portion and the other of said upper and lower web wall portions and bearing against outboard surfaces of said projection portions.

2. The crosspiece as defined in claim 1 wherein said web plate opposite end portions engage said U-beam flanges.

3. The crosspiece as defined in claim 1 wherein said web plate upper edge portions engage said U-beam flanges.

4. The crosspiece as defined in claim 1 wherein said web plate upper edge portions engage said U-beam flanges, and are in generally mating surface engagement therewith.

5. The crosspiece as defined in claim 1 wherein said flanges have beveled lower surfaces, and said web plate upper edge portions are in general mating engagement with said beveled lower surfaces.

6. The crosspiece as defined in claim 1 including aperture means in said web plate central portion for receiving a holding member therein.

7. The crosspiece as defined in claim 1 wherein each securing member is a bolt having a head and a threaded shaft, the diameter of each shaft corresponds to the width of each slot, each threaded shaft is received in an associated slot, and each bolt head is received in a recess of said web plate central portion.

8. The crosspiece as defined in claim 2 wherein each securing member is a bolt having a head and a threaded shaft, the diameter of each shaft corresponds to the width of each slot, each threaded shaft is received in an associated slot, and each bolt head is received in a recess of said web plate central portion.

9. The crosspiece as defined in claim 3 wherein each securing member is a bolt having a head and a threaded shaft, the diameter of each shaft corresponds to the width of each slot, each threaded shaft is received in an associated slot, and each bolt head is received in a recess of said web plate central portion.

10. The crosspiece as defined in claim 4 wherein each securing member is a bolt having a head and a threaded shaft, the diameter of each shaft corresponds to the width of each slot, each threaded shaft is received in an associated slot, and each bolt head is received in a recess of said web plate central portion.

11. The crosspiece as defined in claim 5 wherein each securing member is a bolt having a head and a threaded shaft, the diameter of each shaft corresponds to the width of each slot, each threaded shaft is received in an associated slot, and each bolt head is received in a recess of said web plate central portion.

12. The crosspiece as defined in claim 6 wherein each securing member is a bolt having a head and a threaded shaft, the diameter of each shaft corresponds to the width of each slot, each threaded shaft is received in an associated slot, and each bolt head is received in a recess of said web plate central portion.

13. The crosspiece as defined in claim 7 wherein a nut is threaded upon each threaded stem and bears against an associated projection portion outboard surface.

14. The crosspiece as defined in claim 8 wherein a nut is threaded upon each threaded stem and bears against an associated projection portion outboard surface.

15. The crosspiece as defined in claim 9 wherein a nut is threaded upon each threaded stem and bears against an associated projection portion outboard surface.

16. The crosspiece as defined in claim 10 wherein a nut is threaded upon each threaded stem and bears against an associated projection portion outboard surface.

17. The crosspiece as defined in claim 11 wherein a nut is threaded upon each threaded stem and bears against an associated projection portion outboard surface.

18. The crosspiece as defined in claim 12 wherein a nut is threaded upon each threaded stem and bears against an associated projection portion outboard surface.

* * * * *